United States Patent
Kuroki et al.

(10) Patent No.: US 7,538,782 B2
(45) Date of Patent: May 26, 2009

(54) IMAGE PROCESSING APPARATUS AND METHOD, AND CALIBRATION DEVICE FOR POSITION AND ORIENTATION SENSOR

(75) Inventors: Tsuyoshi Kuroki, Tokyo (JP); Taichi Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 10/954,196

(22) Filed: Oct. 1, 2004

(65) Prior Publication Data

US 2005/0073531 A1    Apr. 7, 2005

(30) Foreign Application Priority Data

Oct. 1, 2003    (JP) .............................. 2003-343572

(51) Int. Cl.
*G09G 5/00* (2006.01)
(52) U.S. Cl. ................. 345/633; 345/632; 382/285
(58) Field of Classification Search .................. None
See application file for complete search history.

(56) References Cited

U.S. PATENT DOCUMENTS 6,377,277 B1 *  4/2002  Yamamoto ................. 345/629
7,038,699 B2 *  5/2006  Sato et al. .................. 345/633
2002/0060648 A1 *  5/2002  Matsui et al. ................. 345/8
2002/0072416 A1  6/2002  Ohshima ..................... 463/43
2004/0041822 A1 *  3/2004  Iizuka et al. ................ 345/634

FOREIGN PATENT DOCUMENTS

JP    2000-353248    12/2000
JP    2003-528688    9/2003
WO    WO 0174267 A    10/2001

* cited by examiner

*Primary Examiner*—Kee M Tung
*Assistant Examiner*—Jwalant Amin
(74) *Attorney, Agent, or Firm*—Fitzpatrick, Cella, Harper & Scinto

(57) ABSTRACT

A three-dimensional CG manipulation apparatus has a real object, a position and orientation sensor provided to the real object, a support base, a position and orientation sensor provided to the support base, a head-mounted display, a position and orientation sensor provided to the head-mounted display, a sensor information acquisition unit for acquiring information from the sensors, a state determination unit for determining the current state of the real object and support base, a CG data management unit for managing CG data to be displayed, and an image generation unit for generating an image to be displayed on the head-mounted display. In a mixed realty system that presents an image formed by superimposing a virtual CG image on a real object to the user, a manipulation such as replacement or the like can be easily made for the virtual CG image without interrupting the user's operation.

5 Claims, 16 Drawing Sheets

F I G. 13
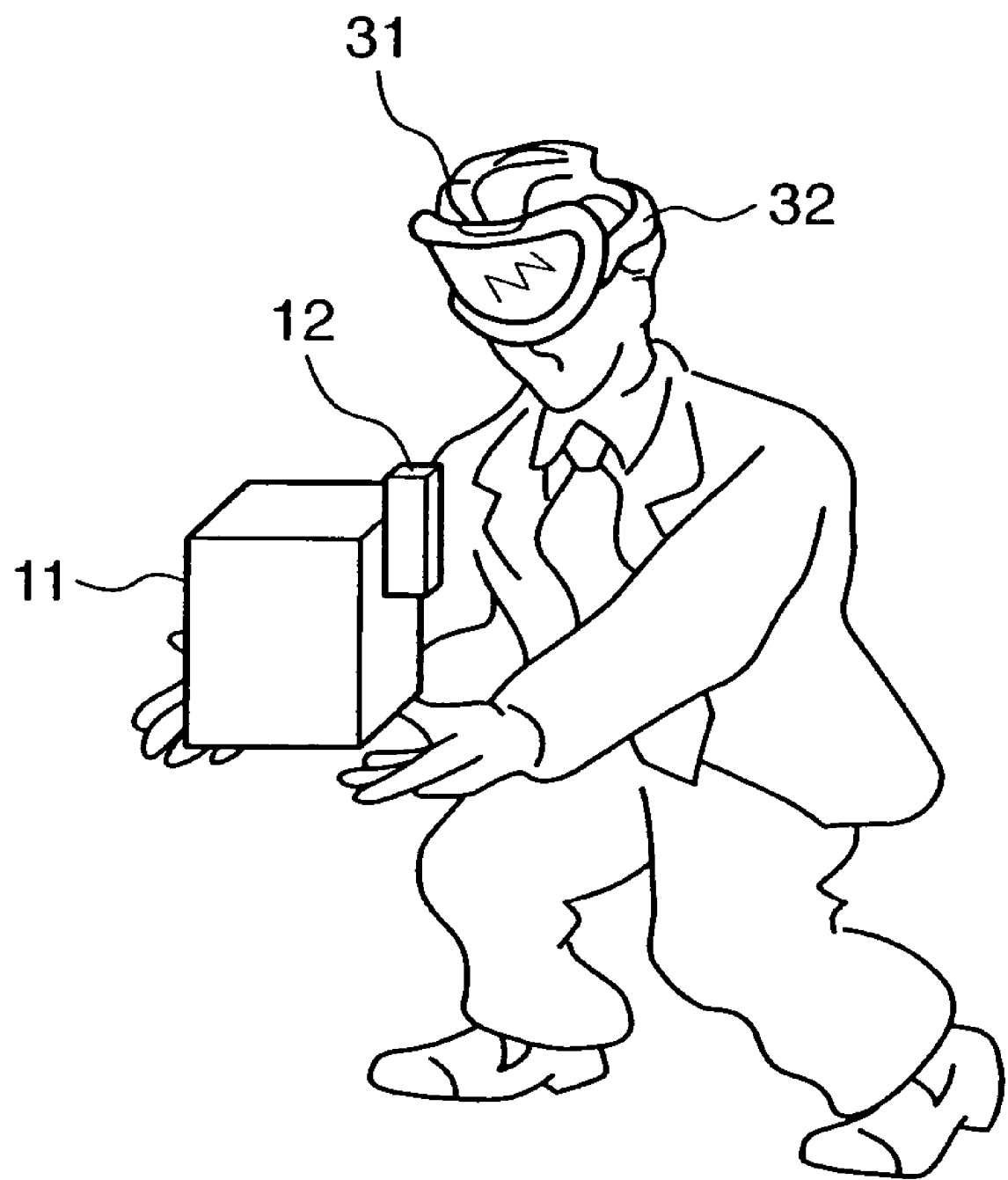

IMAGE PROCESSING APPARATUS AND METHOD, AND CALIBRATION DEVICE FOR POSITION AND ORIENTATION SENSOR

FIELD OF THE INVENTION

The present invention relates to a technique for superimposing and displaying an object (virtual object) in a virtual space rendered by CG (computer graphics) onto a real space.

BACKGROUND OF THE INVENTION

A virtual reality (VR) system represents a three-dimensional computer graphic (3D CG) created by a computer to the user, thus allowing the user to experience a virtual space as if it were real. In recent years, a technique that presents information which is not available in the real world by compositing a 3D CG onto a video of the real world has been developed, and such technique is called an AR (Augmented Reality) system or MR (Mixed Reality) system.

An AR system can superimpose a 3D CG onto a real object. For example, a game described in Japanese Patent Laid-Open No. 2000-353248 (reference 1) (corresponding US Publication Number: 2002-072416) superimposes a 3D CG of a sword, other weapon, or the like onto an interactive operation input device held by the user, thus allowing the user to freely manipulate a virtual object (in this case, a sword or other weapon).

In the apparatus described in reference 1, when the user holds the interactive operation input device at a specific posture, the contents of a 3D CG to be superimposed on the interactive operation input device change. More specifically, if the user holds the device like a sword, a 3D CG of the sword is superimposed on the interactive operation input device; if he or she holds the device like a shield, a 3D CG of the shield is superimposed on the interactive operation input device.

In this way, in order to switch a virtual object to be superimposed on a real object, the user must make a specific gesture or use an input device such as a mouse or the like. For this reason, when the user wants to change a 3D CG while holding a real object and observing the 3D CG of a virtual object superimposed on that object, he or she must make a gesture or operate the input device, and must pause an ongoing operation.

SUMMARY OF THE INVENTION

The present invention has been made in consideration of the conventional problems, and has as its principal object to allow a user to change a 3D CG superimposed on a real object without interrupting the current operation.

In the apparatus of reference 1, a 3D CG to be superimposed moves simultaneously with movement of an interactive operation input device equipped with a position and orientation sensor.

Since the position and orientation sensor is normally calibrated at the beginning of use, it outputs accurate position and orientation information immediately after the beginning of use to accurately superimpose a CG on a real object. However, with the lapse of time, the environment changes and position and orientation information may go wrong. Some position and orientation sensors generate cumulative errors in position and orientation information depending on the amounts they have moved.

Therefore, the user must be able to easily correct the position and orientation information of the position and orientation sensor not only at initialization but also during execution of an application. The present invention has been made also to solve such problem.

According to an aspect of the present invention, there is provided an image processing method comprising: a position and orientation detection step of detecting a position and orientation of a real object; and an image generation step of generating a CG image to be superimposed on the real object, and wherein the image generation step includes a step of: changing the CG image to be generated in correspondence with the position and orientation of the real object detected in the position and orientation detection step.

According to another aspect of the present invention, there is provided an image processing method comprising: a position and orientation detection step of detecting a position and orientation of a real object; an image generation step of generating a CG image; and a determination step of determining in correspondence with the position and orientation of the real object detected in the position and orientation detection step whether the CG image is to be superimposed on the real object or is displayed at a predetermined position regardless of the position and orientation of the real object.

According to a further aspect of the present invention, there is provided an image processing apparatus comprising: position and orientation detection unit configured to detect a position and orientation of a real object; and image generation unit configured to generate a three dimensional CG image to be superimposed on the real object, and wherein the image generation unit changes the CG image to be generated in correspondence with the position and orientation of the real object detected by the position and orientation detection unit.

According to a further aspect of the present invention, there is provided an image processing apparatus comprising: position and orientation detection unit configured to detect a position and orientation of a real object; image generation unit configured to generate a CG image; and determination unit configured to determine in correspondence with the position and orientation of the real object detected by the position and orientation detection unit whether the three dimensional CG image is to be superimposed on the real object or is displayed at a predetermined position regardless of the position and orientation of the real object.

According to a further aspect of the present invention, there is provided a computer program making a computer execute an image processing method of the present invention or a computer readable recording medium storing that computer program.

According to a further aspect of the present invention, there is provided a position and orientation sensor calibration device comprising: holding unit configured to hold a real object having a position and orientation sensor so that a position and orientation to be output by the position and orientation sensor have known values; and calibration unit configured to associate the output values of the position and orientation sensor with the known values when the real object is held by the holding unit.

Using the image processing apparatus and method according to the present invention, the user can easily change the contents of a virtual CG without interrupting the current operation.

According to the present invention, since the position and orientation information of the position and orientation sensor can be frequently corrected to correct values by a natural operation during execution of an application, high superimposing position precision of a 3D CG onto a real object can be maintained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 shows a user of a mock-up system in the third embodiment of the present invention from the perspective of a third party;

DETAILED DESCRIPTION OF THE PREFERRED EMBODIMENTS

Preferred embodiments of the present invention will now be described in detail in accordance with the accompanying drawings.

First Embodiment

In this embodiment, in a system wherein a three-dimensional computer graphics (3D CG) of a teapot as a virtual object is superimposed on a real object which can be picked up and manipulated by the user so as to allow the user to observe a virtual teapot via a head-mounted display (HMD), the user can change the 3D CG of the teapot by a simple operation.

Figure 1:
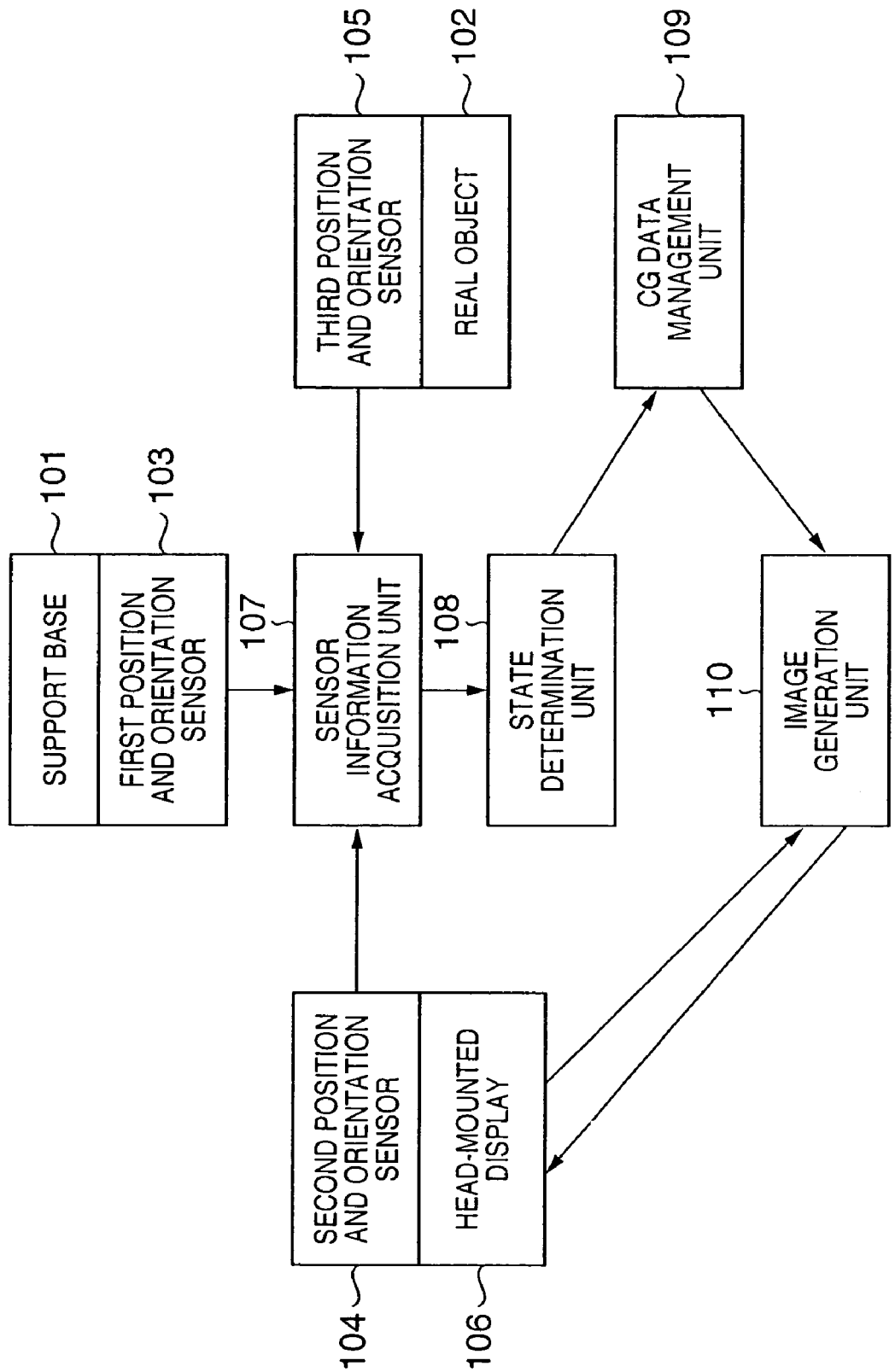
FIG. 1 is a block diagram showing an example of the arrangement of a 3D CG manipulation apparatus according to an embodiment of the present invention.

FIG. 1 is a block diagram showing an example of the arrangement of a 3D CG manipulation apparatus according to this embodiment. A support base 101 is not particularly limited as long as it can support a real object 102, and a wood table, rack, or the like may be used. The real object 102 is not particularly limited as long as it can have a position and orientation sensor 105. In this embodiment, a plastic cube is used.

First to third position and orientation sensors 103, 104, and 105 are respectively arranged on the support base 101, a head-mounted display 106, and the real object 102, and measure their relative positions and orientations. The first to third position and orientation sensors 103, 104, and 105 may adopt arbitrary arrangements as long as they can measure each other's relative positions and orientations. For example, the position and orientation sensor 103 may be a magnetic field generator, and the position and orientation sensors 104 and 105 may be magnetic sensors which measure the relative positions and orientations from the position and orientation sensor 103 by measuring the magnetic field generated by the position and orientation sensor 103.

Also, the position and orientation sensors 103 and 105 may be absolute position indices (markers) arranged on the real space, and the second position and orientation sensor 104 may be an image sensing unit equipped on the head-mounted display 106 that the user wears. The relative positions and orientations of the first to third position and orientation sensors 103, 104, and 105 may be detected on the basis of the image coordinate positions and absolute positions of markers, corresponding to the first and second position and orientation sensors 103 and 105, captured in an image sensed by the image sensing unit. Three sets of position and orientation information obtained from the position and orientation sensors 103, 104, and 105 are sent to a sensor information acquisition unit 107.

The head-mounted display 106 is mounted on the head of the user, and presents an image received from an image generation unit 110 (to be described later) to the user. The head-mounted display 106 may have an image sensing unit (not shown). In this case, an image sensed by the image sensing unit is sent to the image generation unit 110. Note that the head-mounted display 106 has an image sensing unit in this embodiment.

The sensor information acquisition unit 107 acquires or calculates three sets of relative position and orientation information from the sensor information obtained from the first, second, and third position and orientation sensors 103, 104, and 105, and passes them to a state determination unit 108. The state determination unit 108 generates CG data change information on the basis of the position and orientation information sent from the sensor information acquisition unit 107, and passes it to a CG data management unit 109. The CG data management unit 109 manages scene information, i.e., 3D CG information that represents a virtual object present on a virtual space. Information to be managed in this embodiment includes, e.g., the shape, color, texture, position, orientation, and the like of a teapot. The CG data management 109 stores a viewpoint position and orientation used upon rendering a scene. The CG data management unit 109 changes the contents of 3D CG data upon reception of the CG data change information from the state determination unit 108, and outputs CG data information to the image generation unit 110.

The image generation unit 110 generates a CG on the basis of the CG data information from the CG data management unit 109, and sends a CG image to the head-mounted display 106. When the head-mounted display 106 has the image sensing unit, an image sensed by the head-mounted display 106 is composited to the generated CG, and a composite image is sent to the head-mounted display 106.

Figure 2:
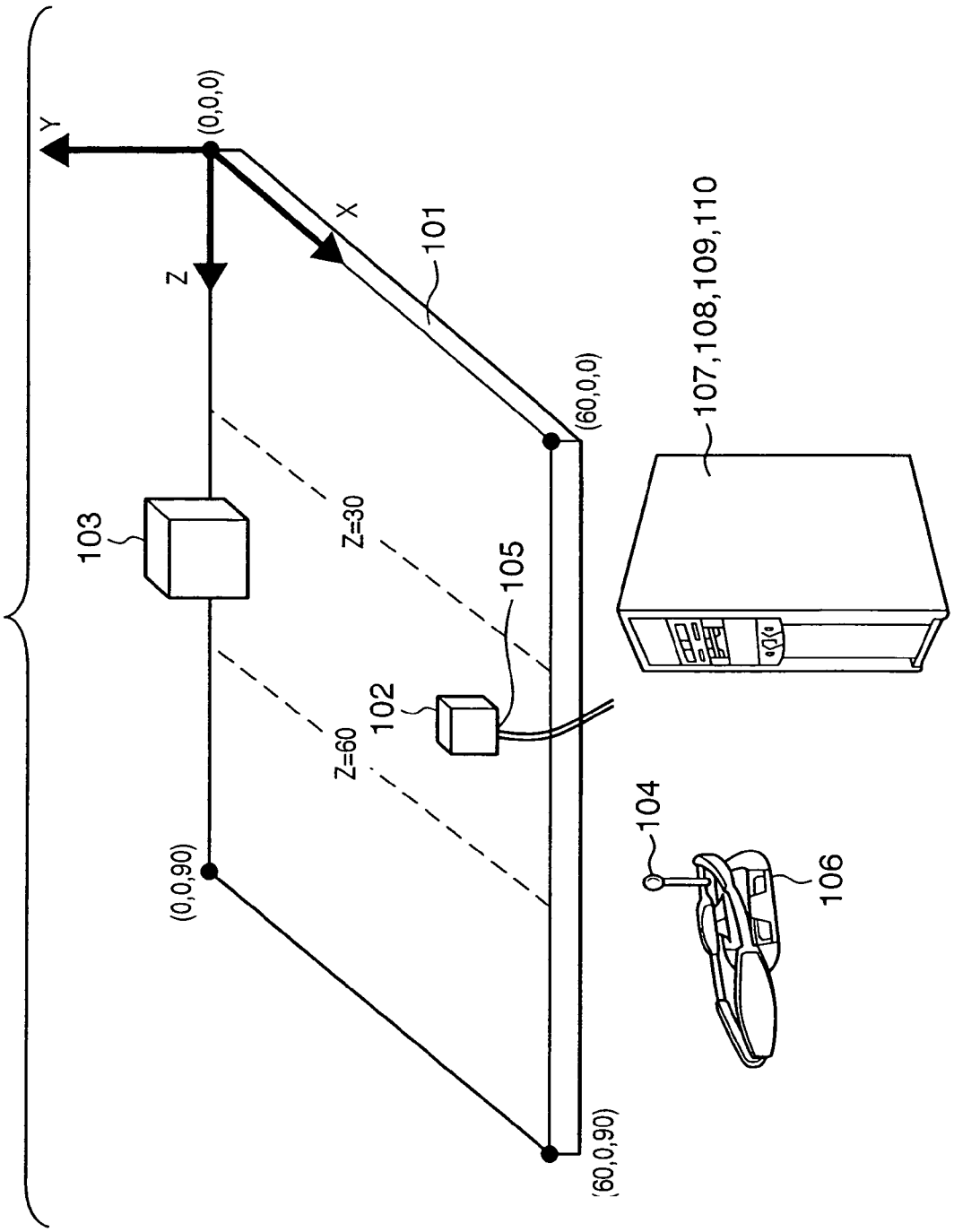
FIG. 2 depicts a use state of the 3D CG manipulation apparatus shown in FIG. 1.

FIG. 2 depicts a use state of the 3D CG manipulation apparatus shown in FIG. 1. In this embodiment, the support base 101 is implemented by a 90×60 (width×depth: cm) plastic table, the real object 102 is implemented by a 5-cm$^3$ plastic cube, the first position and orientation sensor 103 is implemented by a magnetic field generator, the second and third position and orientation sensors 104 and 105 are implemented by magnetic sensors, and the head-mounted display 106 is implemented by a head-mounted display with an image sensing unit.

Note that the sensor information acquisition unit 107, state determination unit 108, CG data management unit 109, and image generation unit 110 in FIG. 1 may be configured as independent devices, or some or all of these units may be implemented by software, which is executed by CPUs of one or a plurality of computers to implement their functions. In this embodiment, all of the respective units (sensor information acquisition unit 107, state determination unit 108, CG data management unit 109, and image generation unit 110) are implemented by software, and are executed in a single computer.

The magnetic sensors used as the second and third position and orientation sensors 104 and 105 output positions and orientations on a right-hand coordinate system which has a right back corner of the support base 101 as an origin, a front direction as an X-axis, and an up direction as a Y-axis, and the coordinate values of the four corners of the surface (top surface) of the support base 101 are respectively (X, Y, Z)=(0, 0, 0), (0, 0, 90), (60, 0, 90), and (60, 0, 0), as shown in FIG. 2. The magnetic sensor which forms the third position and orientation sensor 105 attached to the real object 102 is set in advance to output Y=0 when the bottom surface of the real object 102 contacts the surface of the support base 101.

Figure 10:
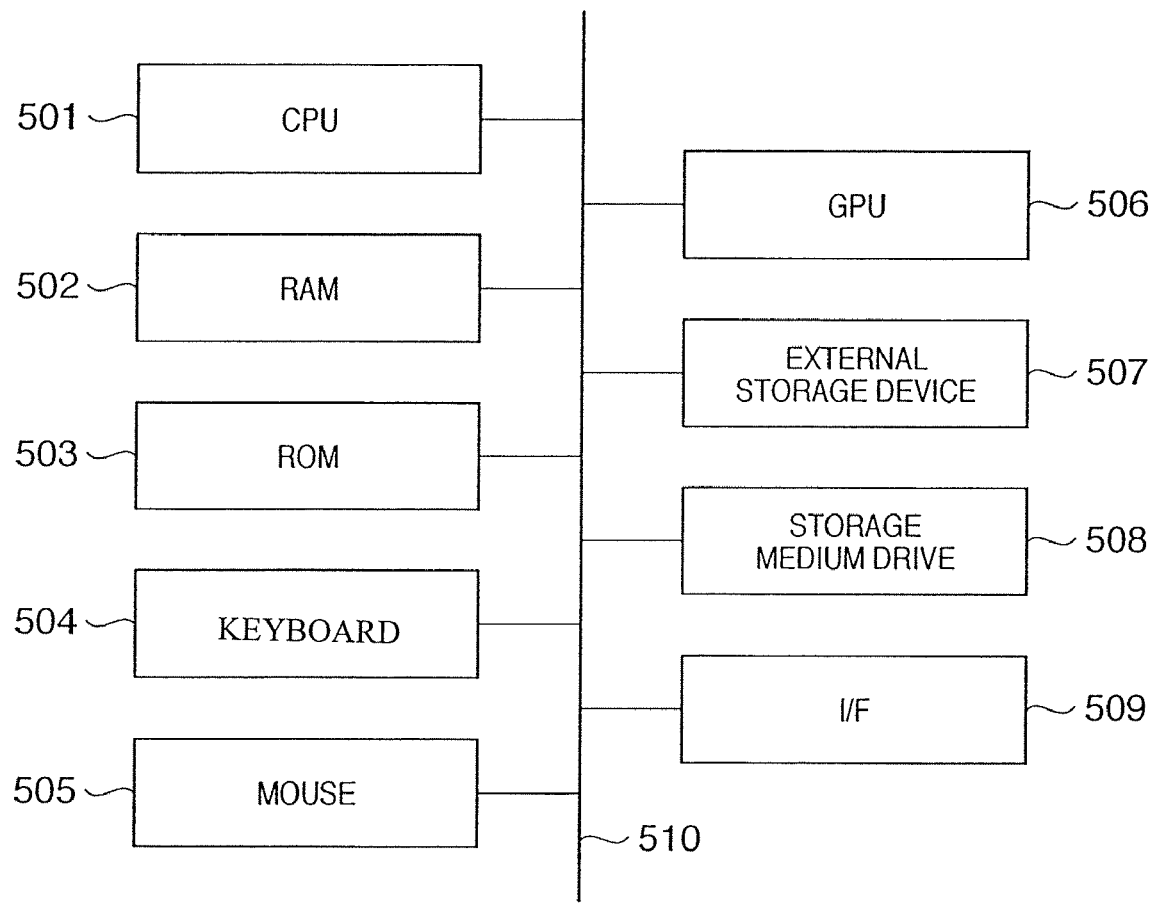
FIG. 10 is a block diagram showing an example of the arrangement of a computer which can implement a sensor information acquisition unit 107, state determination unit 108, CG data management unit 109, and image generation unit 110 in FIG. 1.

FIG. 10 is a block diagram showing an example of the basic arrangement of a computer which can implement the sensor information acquisition unit 107, state determination unit 108, CG data management unit 109, and image generation unit 110 by executing software.

A CPU 501 controls the overall computer using programs and data stored in a RAM 502 and ROM 503, and serves as the sensor information acquisition unit 107, state determination unit 108, CG data management unit 109, and image generation unit 110 by executing software programs that implement these units.

The RAM 502 has an area for temporarily storing programs and data loaded from an external storage device 507 and storage medium drive 508, and a work area required for the CPU 501 to execute various processes.

The ROM 503 stores software programs, which are generally executed by the computer upon startup, setting data, and the like. A keyboard 504 and mouse 505 are examples of the aforementioned input device (not shown), and the operator can input various instructions to the CPU 501 using these devices.

A GPU (Graphics Processing Unit) 506 is a processor used to execute a graphic process, and also has an image output function to a display device such as a CRT, liquid crystal monitor, or the like. In this embodiment, the GPU 506 outputs an image to the head-mounted display 106.

The external storage device 507 serves as a large-capacity information storage device such as a hard disk or the like, and saves an OS (operating system), software programs which implement the sensor information acquisition unit 107, state determination unit 108, CG data management unit 109, and image generation unit 110.

The storage medium drive 508 reads out programs and data stored in a removable storage medium such as a CD-ROM, DVD-ROM, or the like in accordance with an instruction from the CPU 501, and outputs them to the RAM 502 and external storage device 507.

An I/F 509 is used to connect the first to third position and orientation sensors 103, 104, and 105 and head-mounted display 106, whose outputs are fetched by the RAM 502 via the I/F 508. A bus 510 interconnects the respective units in the computer.

Figure 6:
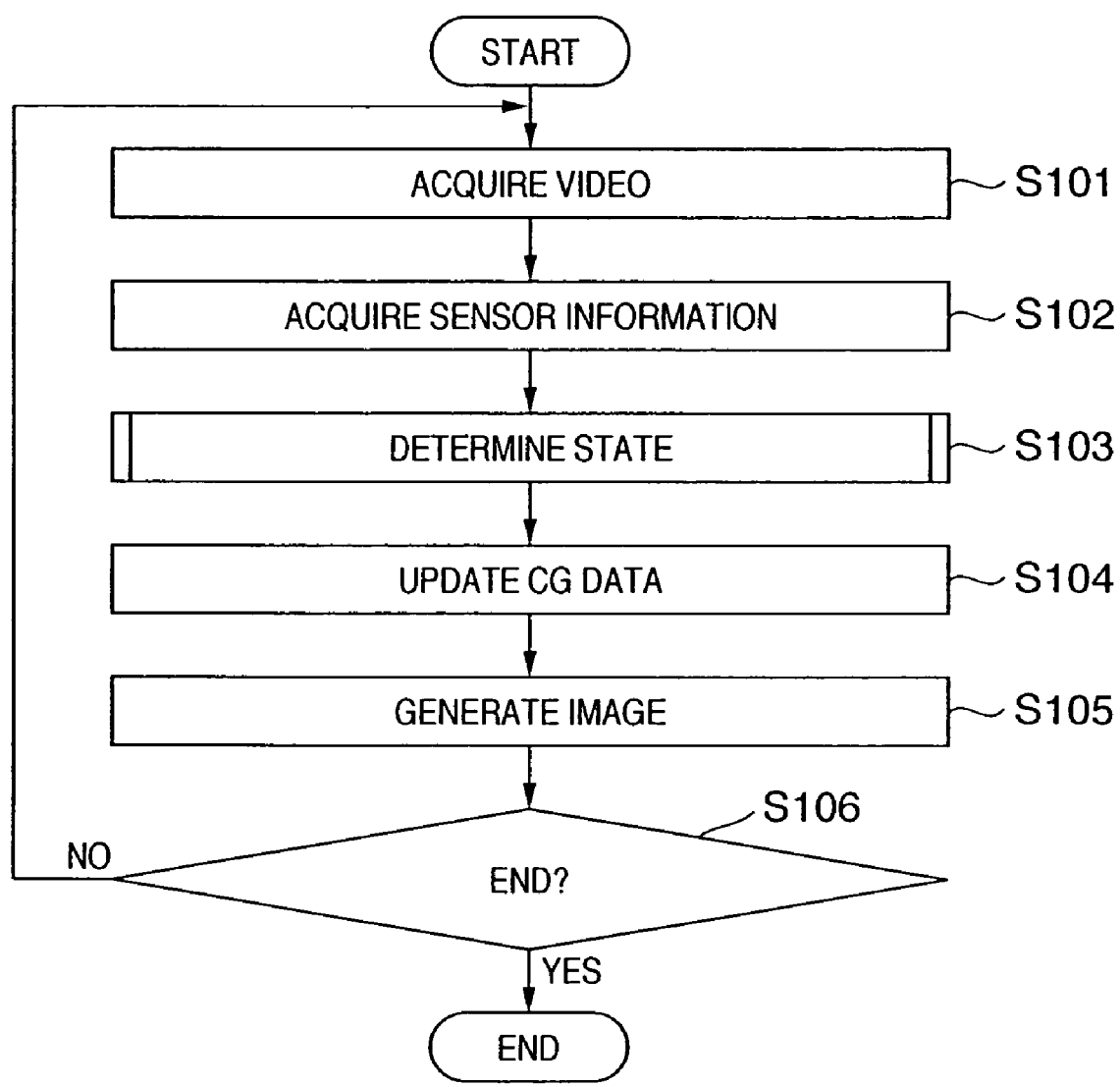
FIG. 6 is a flowchart for explaining a CG data change process in the first embodiment of the present invention.

FIG. 6 is a flowchart of a CG data update process in this embodiment, which is implemented by executing a software program by the CPU 501. Assume that software programs required to implement the functions of the sensor information acquisition unit 107, state determination unit 108, CG data management unit 109, and image generation unit 110 have already been loaded from the external storage device 507, storage medium drive 508, and the like onto the RAM 502, prior to the process shown in FIG. 6.

Also, assume that the program corresponding to the flowchart of FIG. 6 starts simultaneously with when the user starts up the 3D CG manipulation apparatus.

In step S101, an actually captured image sensed by the image sensing unit equipped on the head-mounted display 106 is sent from the head-mounted display 106 to the image generation unit 110. Note that this step is not required when the head-mounted display 106 is of an optical see-through type without any image sensing unit.

In step S102, the sensor information acquisition unit 107 acquires position and orientation information relative to the first position and orientation sensor 103 from the magnetic sensors which form the second position and orientation sensors 104 and the third position and orientation sensors 105.

In step S103, the state determination unit 108 determines a state based on the position and orientation information acquired in step S102, generates CG data change information, and sends it to the CG data management unit 109.

Figure 7:
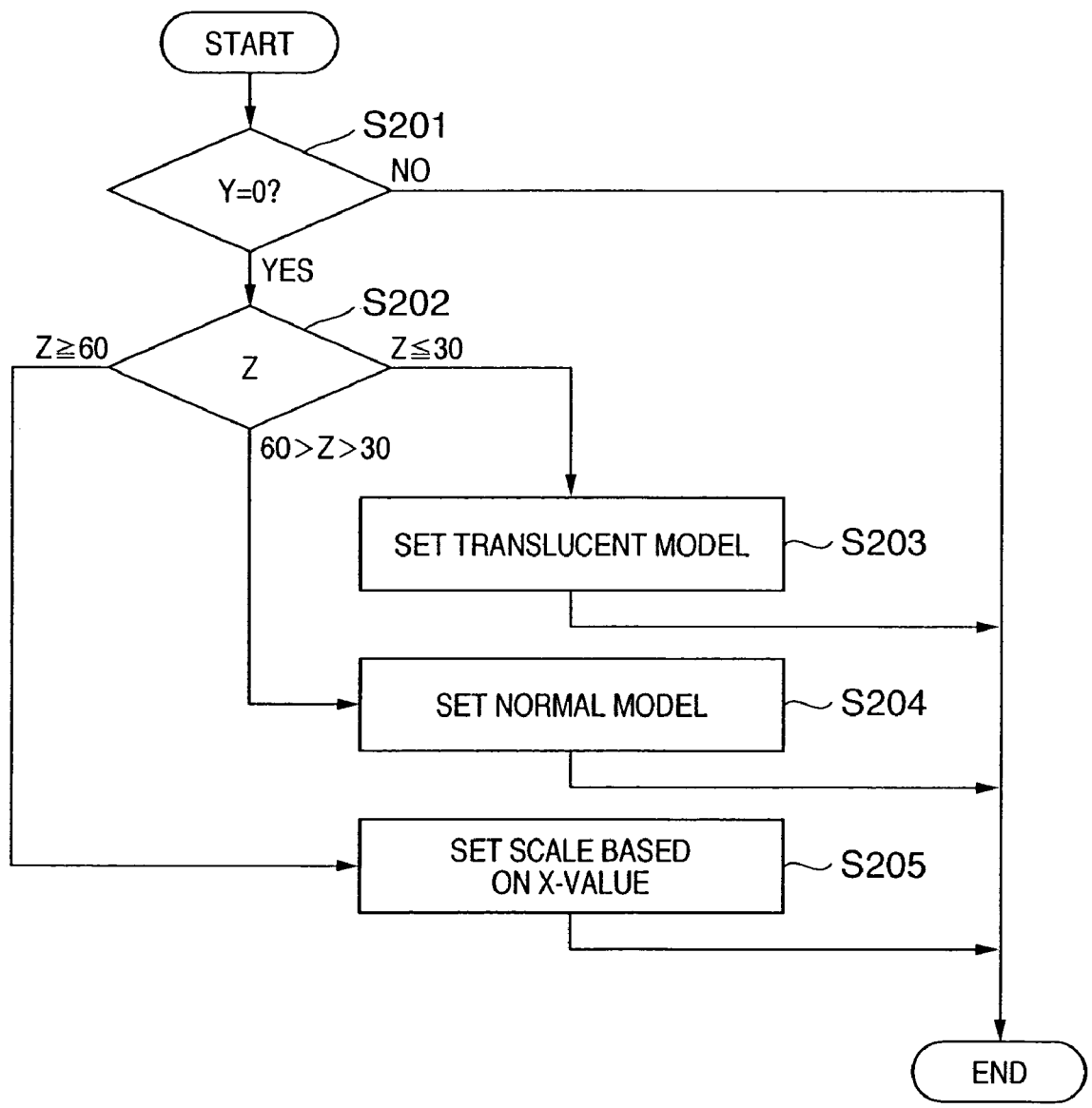
FIG. 7 is a flowchart for explaining a state determination process executed in step S103 in FIG. 6.

The state determination process of the state determination unit 108 done in step S103 will be described below using the flowchart shown in FIG. 7. Assume that the process shown in FIG. 7 starts simultaneously with when the process shown in FIG. 6 has reached step S103.

In step S201, the coordinate value of the third position and orientation sensor 105 attached to the real object is checked. If the Y-value is zero, i.e., if the bottom surface of the real object 102 contacts the surface of the support base 101, the flow advances to step S202; otherwise, the flow ends.

In step S202, the Z-value of the third position and posture sensor 105 is checked. If Z≦30, the flow advances to step S203; if 30<Z<60, the flow advances to step S204; if Z≧60, the flow advances to step S205.

In step S203, the CD data change information is transmitted to the CG data management unit 109 to set a translucent model as CG data of a teapot to be displayed. Note that the translucent model indicates a CG model which is set so that the interior of the teapot is seen through. Likewise, in step S204 the CD data change information is transmitted to the CG data management unit 109 to set a normal model as CG data of a teapot to be displayed.

Figure 3:
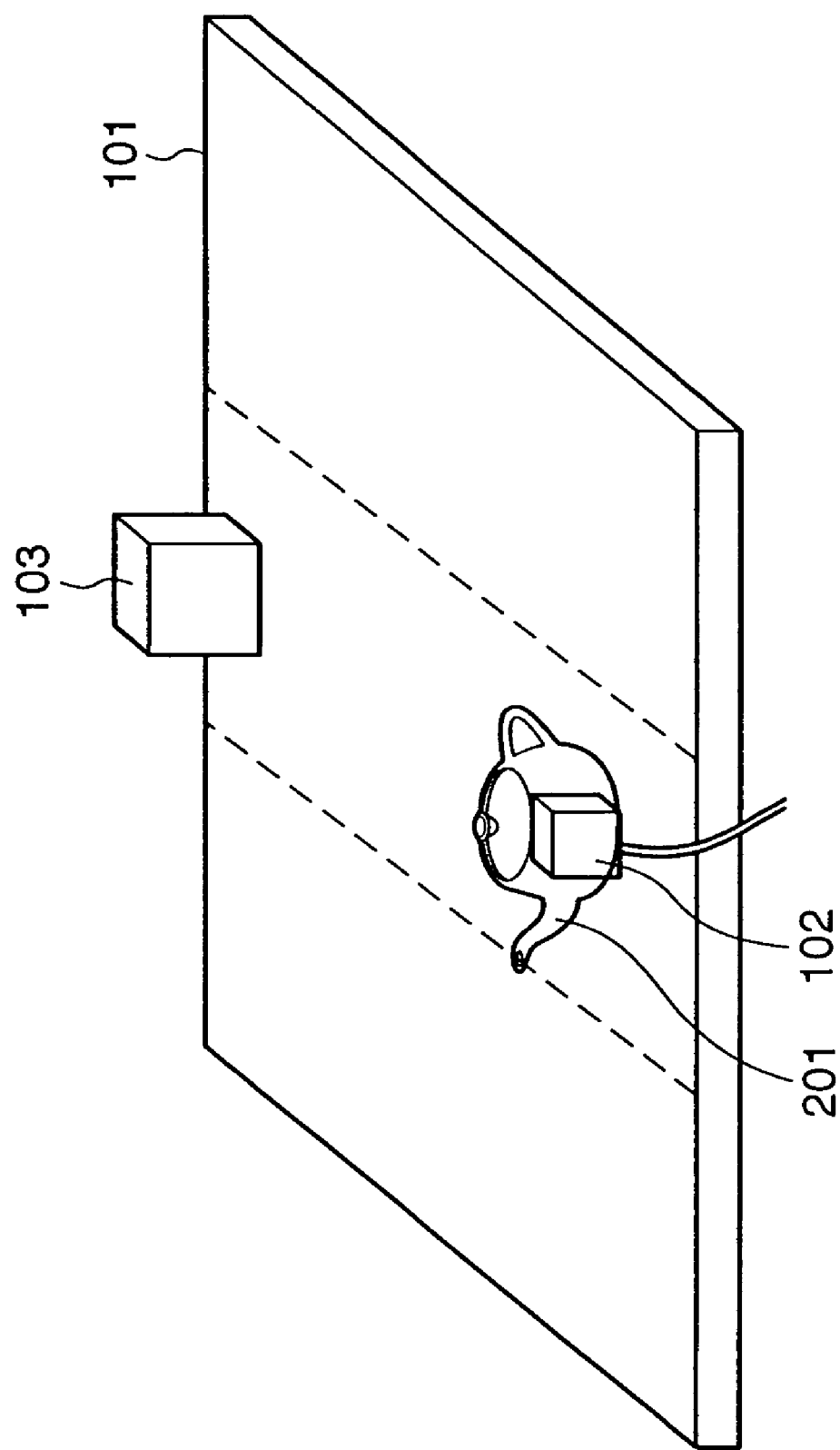
FIGS. 3 to 5 are views for explaining a 3D CG display switching process in the first embodiment of the present invention.
Figure 4:
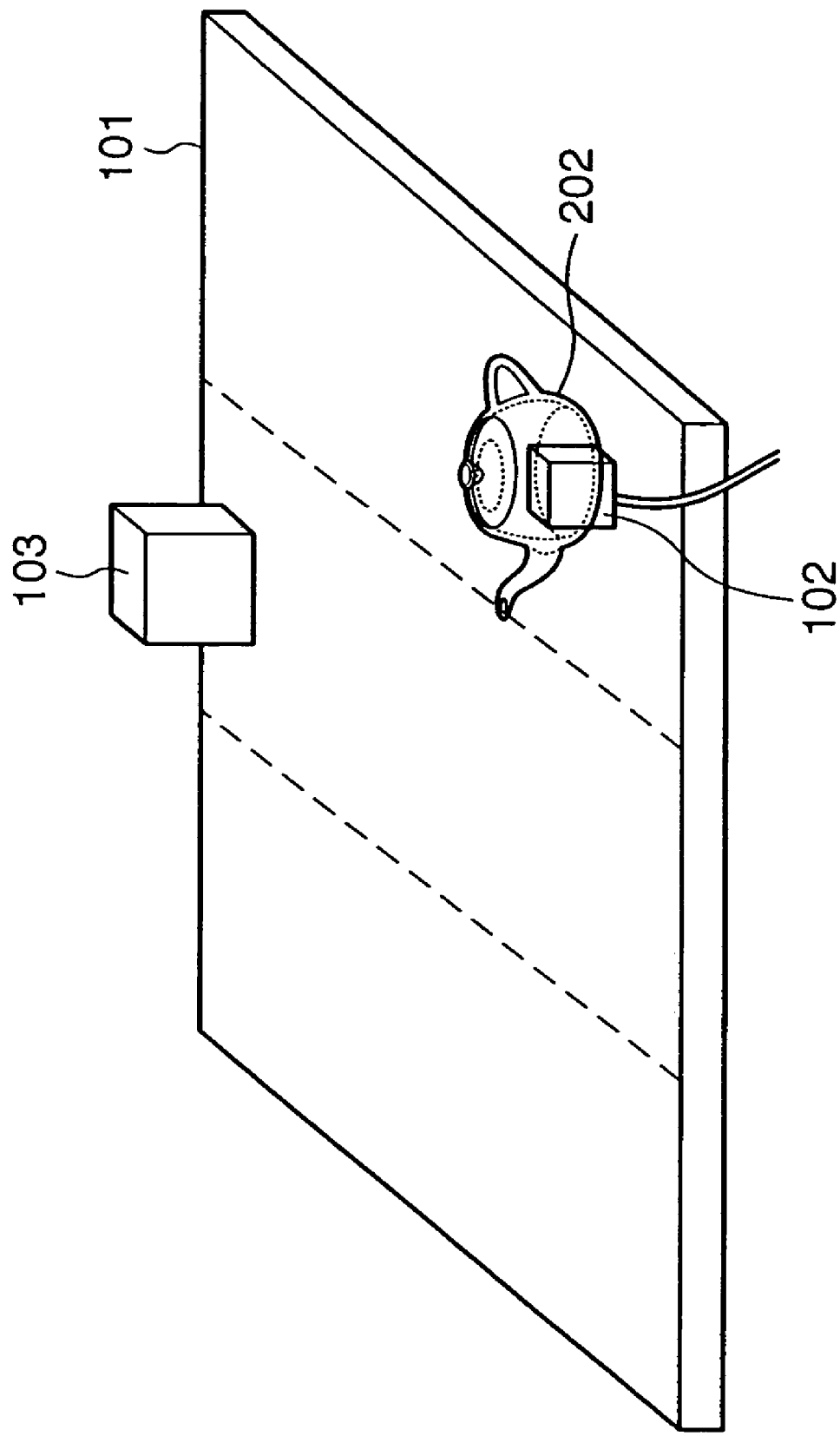

As a result, when the real object 102 is placed on the central zone (a range of 60>Z>30) of the support base 101, as shown in FIG. 3, a normal teapot 201 is displayed. When the real object 102 is placed on the right zone (Z≦30) of the support base 101, as shown in FIG. 4, a translucent teapot 202 is displayed.

The type (normal or translucent) of teapot to be displayed when the real object 102 is placed on a zone of Z≧60 is determined depending on a zone where the real object 102 was placed immediately before the zone of Z≧60. Therefore, when the user picks up the real object 102 placed on the zone of Z≦30 and places it on the zone of Z≧60 (without placing it on the region of 60>Z>30), a transparent teapot is displayed. On the other hand, when the user moves the real object 102 placed on the zone of 60>Z>30 to the zone of Z≧60, a normal teapot is displayed.

On the other hand, if Z≧60, the X-value of the third position and orientation sensor 105 is checked in step S205. The scale of the CG model of the teapot to be displayed is determined according to the X-value, and the CG data change information is transmitted to the CG data management unit 109 to change the display scale. Note that the relationship between the X-value and scale is not particularly limited. For example, the scale "scale" is determined by:

$$\text{scale}=2^{(-X/30+1)}$$

Figure 5:
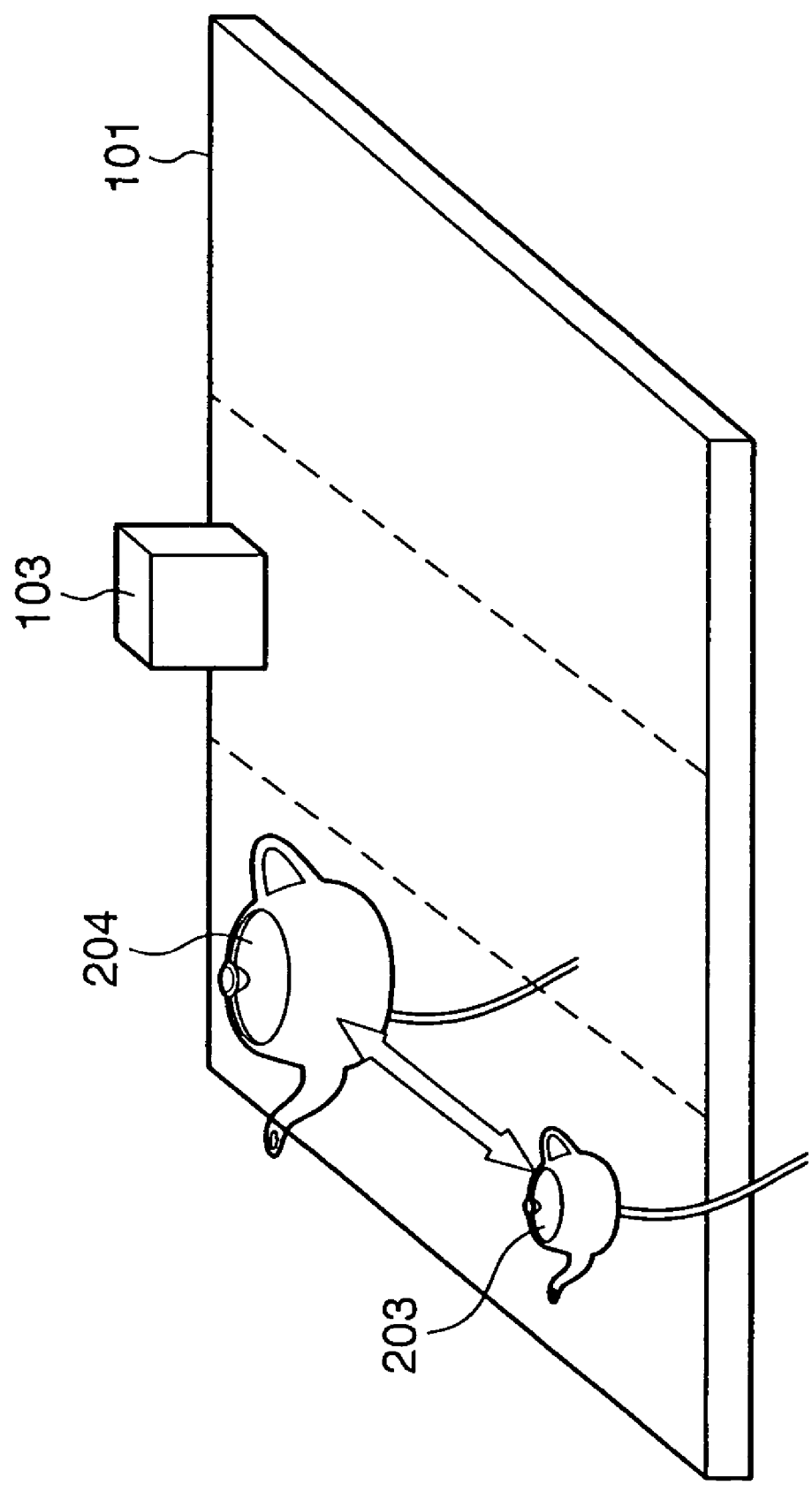

In this manner, when the user places the real object 102 on the back side, a larger teapot 204 can be displayed; when he or she places the real object 102 on the front side, a smaller teapot 203 can be displayed, as shown in FIG. 5.

Upon completion of the process in one of steps S203, S204, and S205, the state determination process ends, and the flow advances to step S104 in FIG. 6.

In step S104, CG data is updated. The CG data management unit 109 updates 3D CD data information stored in it on the basis of the CG data change information generated by the state determination unit 108 in step S103.

For example, when the change to the translucent or normal model is set, the CG data of the teapot to be displayed may be changed by an arbitrary method. For example, the following method may be used. The CG data management unit 109 stores information indicating the shapes, colors, positions, and orientations of translucent and normal teapots. Furthermore, the CG data management unit 109 stores display model information indicating which of the teapots is displayed in a current scene. In step S203 or S204, the CG data change information which changes that display model information is transmitted.

On the other hand, when the change in scale is set, the CG data management unit 109 updates CG data information stored in it on the basis of the received CG data change information.

Next, the position and orientation of the viewpoint where a scene in the CG data management unit 109 are updated on the basis of the position and orientation information of the user's viewpoint acquired from the second position and orientation sensor 104 in step S102. Also, the position and orientation of the teapot are updated on the basis of the position and orientation information of the real object 102 acquired from the third position and orientation sensor 105.

In step S105, an image is generated. The image generation unit 110 acquires the position and orientation information of the viewpoint and that of the teapot from the CG data management unit 109, and generates a 3D CG from the perspective of the viewpoint position. This CG image is composited to the actually captured image acquired in step S101, and a composite image is sent to the head-mounted display 106. The head-mounted display 106 displays the received composite image.

Upon generating a 3D CG in step S105, lines of Z=30 and Z=60 as boundaries where a 3D CG image to be superimposed on the real object 102 is changed may be created and displayed as virtual object by 3D CG, as shown in FIG. 2. By generating such CG images, the user can visually recognize positions where the model of the teapot is replaced by another when he or she places the real object 102.

As described above, according to this embodiment, the state of a 3D CG image to be superimposed on the real object 102 can be changed depending on the position of the support base 101 where the real object 102 is placed. In this embodiment, only texture and scale data have been explained as the contents to be changed. However, this embodiment can be applied to changes of other parameters associated with generation of a 3D CG.

Second Embodiment

The second embodiment of the present invention will be described below with reference to the accompanying drawings. In this embodiment, a 3D CG manipulation apparatus and method for assembling simulation which allows the user to assemble virtual components superimposed on real objects will be explained.

Figure 9A:
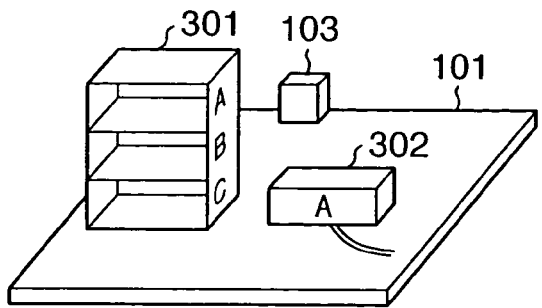
FIGS. 9A to 9G are views for explaining a 3D CG manipulation method in the second embodiment of the present invention.

The arrangement of the 3D CG manipulation apparatus of this embodiment is the same as that of the first embodiment, as has been explained using FIGS. 1 and 10. FIG. 9A depicts a use state of the 3D CG manipulation apparatus of this embodiment. In this embodiment, a second support base 301 is added to the arrangement shown in FIG. 2. The second support base 301 has a plastic rack shape with three shelves, and is fixed to the first support base 101. As shown in FIG. 9A, the side surface portions of the three shelves of the second support base 301 are respectively labeled by A, B, and C.

In this embodiment, it is checked based on the position and orientation of the position and orientation sensor 105 attached to the real object 102 if the bottom surface of the real object 102 is located at a position where a component is to be mounted. If the bottom surface of the real object 102 is located at the position where a component is to be mounted, a virtual component superimposed on the real object 102 has been mounted to the mount position, and the display position of the virtual component is changed from that on the real object 102 to the mount position. If the real object 102 on which no component is superimposed is placed at an initial position, the next virtual component is superimposed on the real object 102. By repeating this process until all virtual components are placed at their mount positions, assembling simulation is provided.

Figure 9B:
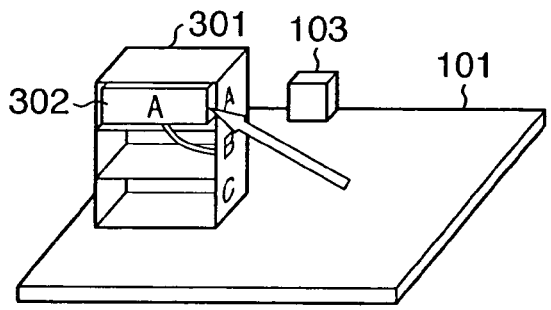

More specifically, as shown in FIG. 9A, a virtual component A (302) is displayed to be superimposed on the real object 102 placed at a predetermined initial position. The user picks up the real object 102 and places it on the uppermost shelf (the shelf labeled by A) of the support base 301 as the mount position of the virtual component A (302), thus setting the component A 302 (FIG. 9B). The state determination unit 108 determines based on the position and orientation which are acquired by the sensor information acquisition unit 107 from the position and orientation sensor 105 attached to the real object 102 whether or not the real object 102 is present at the mount position of the virtual component superimposed at that time. When the virtual component A (302) is superimposed, if the bottom surface of the real object 102 contacts the uppermost shelf (the shelf labeled by A) of the second support base or is located inside the uppermost shelf (the shelf labeled by A), the state determination unit 108 determines that the virtual component A (302) is normally set at the mount position, and transmits CG data change information to change the display position of the virtual component A (302) from that on the real object 102 to the uppermost shelf (the shelf labeled by A) of the second support base.

The CG data management unit 109 updates CG data according to this change information as in step S104. As in step S105, an image is generated using the updated CG data. As a result, the virtual component A (302) is displayed while being fixed to the uppermost shelf (the shelf labeled by A) of the support base 301, and no CG image is superimposed on the real object 102, as shown in FIG. 9C.

If the real object 102 has moved from the mount position of the virtual component A (302) and is placed at the initial position on the support base 101, the state determination unit 108 transmits CG data change information to the CG data management unit 109 to superimpose the next virtual component on the real object 102. In this way, a virtual component B (303) is displayed to be superimposed on the real object 102, as shown in FIG. 9D.

Figure 9E:
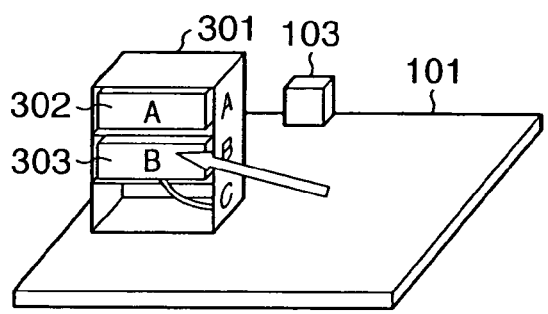
Figure 9C:
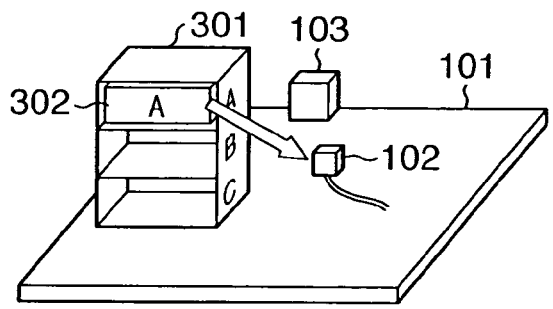
Figure 9F:
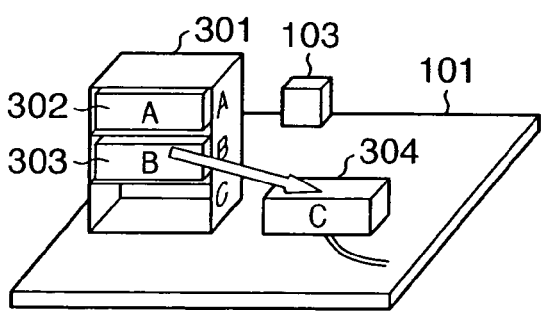
Figure 9D:
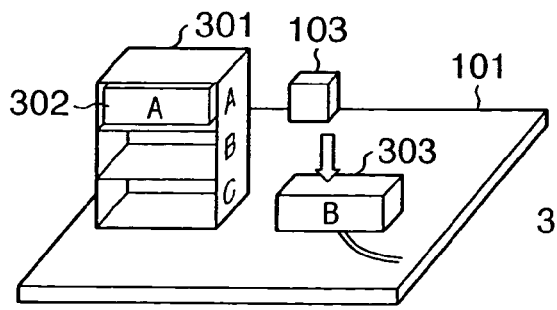
Figure 9G:
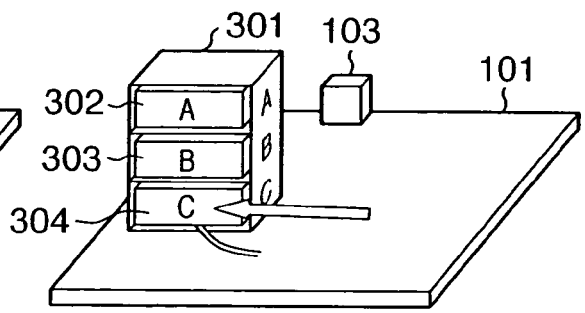

By repeating the aforementioned process, all the components A 302, B 303, and C 304 can be set in the support base 301, as shown in FIGS. 9E to 9G.

The CG data update process in this embodiment is described by the flowchart shown in FIG. 6 as in the first embodiment. However, since the contents of the state determination process in step S103 are different from those in the first embodiment, that process will be described below.

Figure 8:
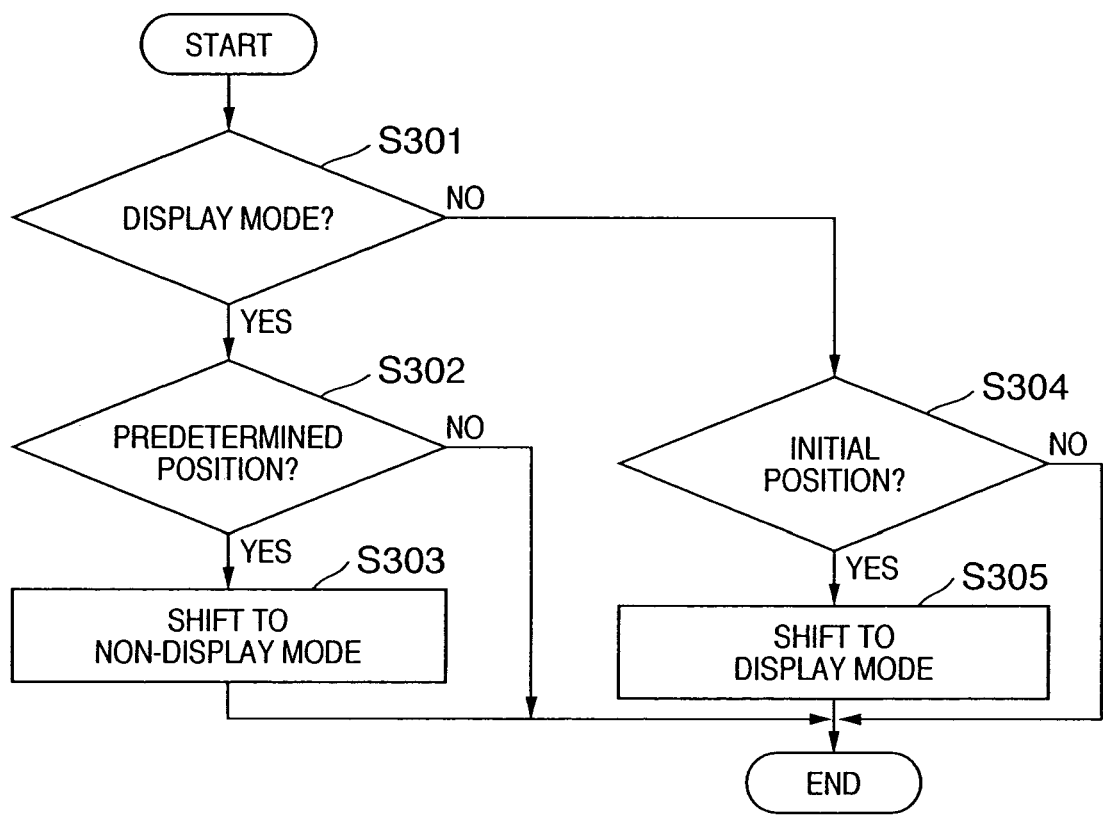
FIG. 8 is a flowchart for explaining a state determination process in the second embodiment of the present invention.

FIG. 8 is a flowchart showing the state determination process to be executed by the state determination unit 108 in this embodiment. Assume that the process shown in FIG. 8 starts simultaneously with the process shown in FIG. 6 has reached step S103.

It is checked in step S301 if a display mode is set. In the display mode, an arbitrary CG image is superimposed on the real object 102, as shown in FIG. 9A. In a non-display mode, no CG image is superimposed on the real object 102, as shown in FIG. 9C. If the display mode is set, the flow advances to step S302; if the non-display mode is set, the flow advances to step S304.

It is checked in step S302 if the real object 102 is stored at a predetermined position to have a correct orientation. Note that the predetermined position indicates an appropriate set position of each individual component. That is, if a CG image displayed on the real object 102 is the component A 302, the predetermined position is the uppermost shelf (the shelf labeled by A) of the support base 301; if a CG image displayed on the real object 102 is the component B 303, the predetermined position is the middle shelf (the shelf labeled by B) of the support base 301; if a CG image displayed on the real object 102 is the component B 304, the predetermined position is the lowermost shelf (the shelf labeled by C) of the support base 301. If it is determined based on the position and orientation information of the real object 102 acquired from the sensor information acquisition unit 107 and the region information (indicated by the ranges of the X-, Y-, Z-values) of respective shelves of the support base 301, which are set in advance, that the real object 102 is stored at the predetermined position to have a correct orientation, i.e., to be free from any tilt, the flow advances to step S303; otherwise, the flow ends.

In step S303, the control shifts to the non-display mode. That is, the CG data change information is transmitted to the CG data management unit 109 to display the virtual component that has been displayed on the real object 102 as an image which is fixed at the predetermined position and orientation, and not to superimpose any image on the real object 102. Upon completion of step S303, the state determination process ends.

It is checked in step S304 if the real object 102 is placed at the initial position. If it is determined that the real object 102 is placed at the initial position, the flow advances to step S305; otherwise, the state determination process ends.

In step S305, the control shifts to the display mode, and CG data change information is transmitted to the CG data management unit 109 to display a CG image of a new virtual component on the real object 102. However, if all virtual components have already been correctly set in the shelves of the support base 301, no process is done. Upon completion of step S305, the state determination process ends.

As described above, according to this embodiment, assembling simulation using virtual components can be easily implemented.

In the first and second embodiments described above, the 3D CG manipulation apparatus according to the present invention is used in design evaluation and assembling simulation. However, the 3D CG manipulation apparatus according to the present invention can be used in other applications such as a game, architectural simulation, and the like.

Third Embodiment

A calibration method of a position and orientation sensor according to the present invention will be explained below taking an embodiment in which it is applied to a digital mock-up system exploiting the MR technique as an example.

A digital mock-up system according to this embodiment is a system that superimposes and presents a 3D CG image that represents a concrete shape and outer appearance of a given industrial product onto a simple mock-up (model) of that product using the MR technique. The system user can actually pick up and touch the mock-up while observing the mock-up superimposed with the 3D CG image of the product, and can virtually operate it.

The mock-up incorporates a position and orientation sensor. 3D CG data is generated in correspondence with the position and orientation of the mock-up detected from the measurement values of that sensor, and is superimposed on the mock-up. For this reason, the user can experience as if he or she were picking up a product represented by the concrete 3D CG image superimposed on the mock-up, although he or she handles the simple mock-up in practice.

In order to make the user virtually experience the mock-up as a simple model as if it were a product represented by the 3D CG image superimposed on that mock-up, the mock-up and 3D CG image to be superimposed on it must not deviate from each other.

Figure 11:
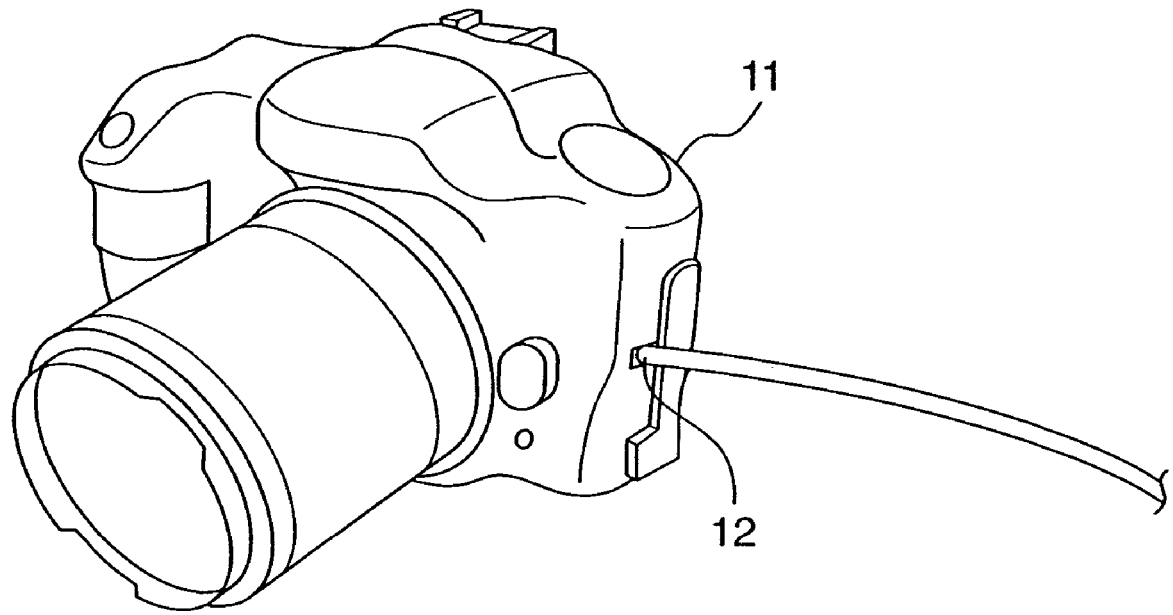
FIG. 11 shows an outer appearance of a mock-up used in the third embodiment of the present invention.

FIG. 11 shows an outer appearance of a mock-up 11 with a position and orientation sensor used in this embodiment. A position and orientation sensor 12 is incorporated in a mock-up 11, and a cable used to obtain an output signal extends outside the mock-up 11.

Figure 12:
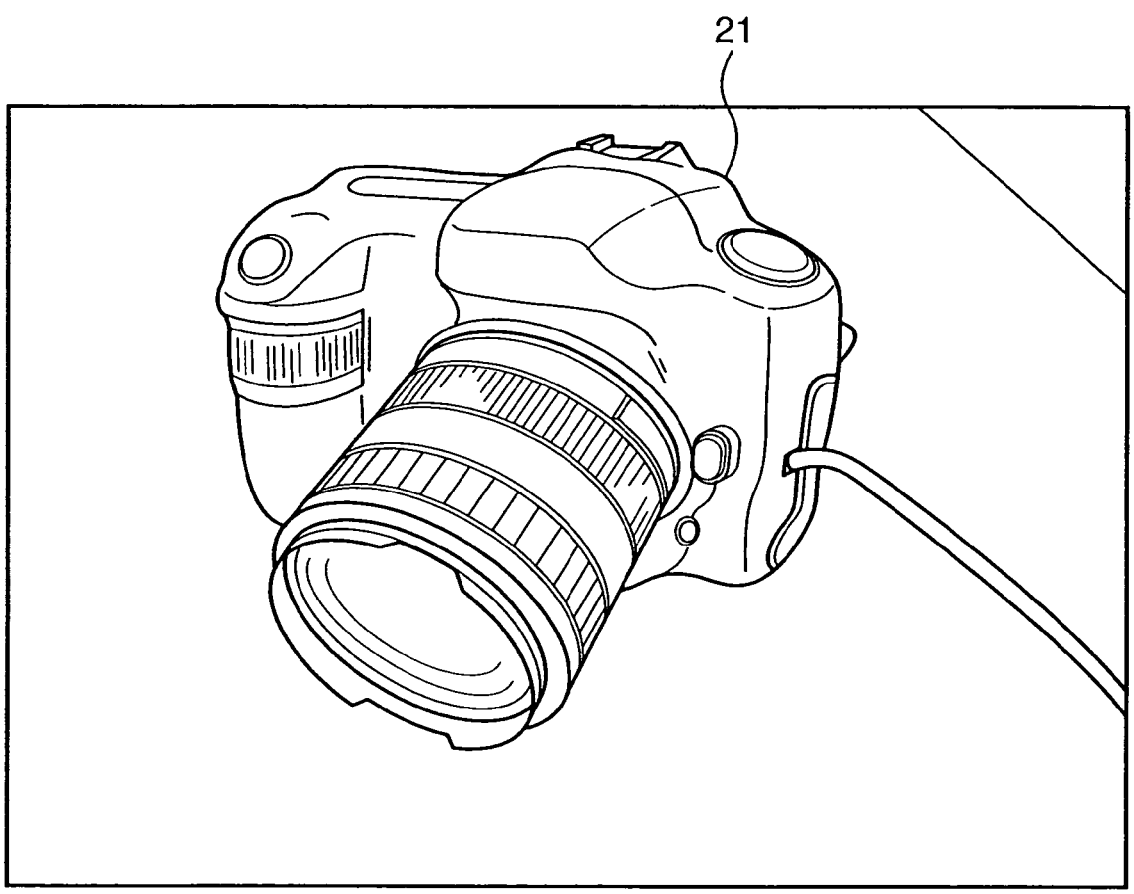
FIG. 12 shows a state wherein a 3D CG is superimposed on the mock-up shown in FIG. 11.

FIG. 12 shows a state wherein a 3D CG camera 21 is superimposed on the mock-up 11 using the MR technique. If the 3D CG image is normally aligned and superimposed, the mock-up 11 and 3D CG camera 21 exactly overlap each other, and the user can no longer observe the surface of the mock-up 11.

Figure 14:
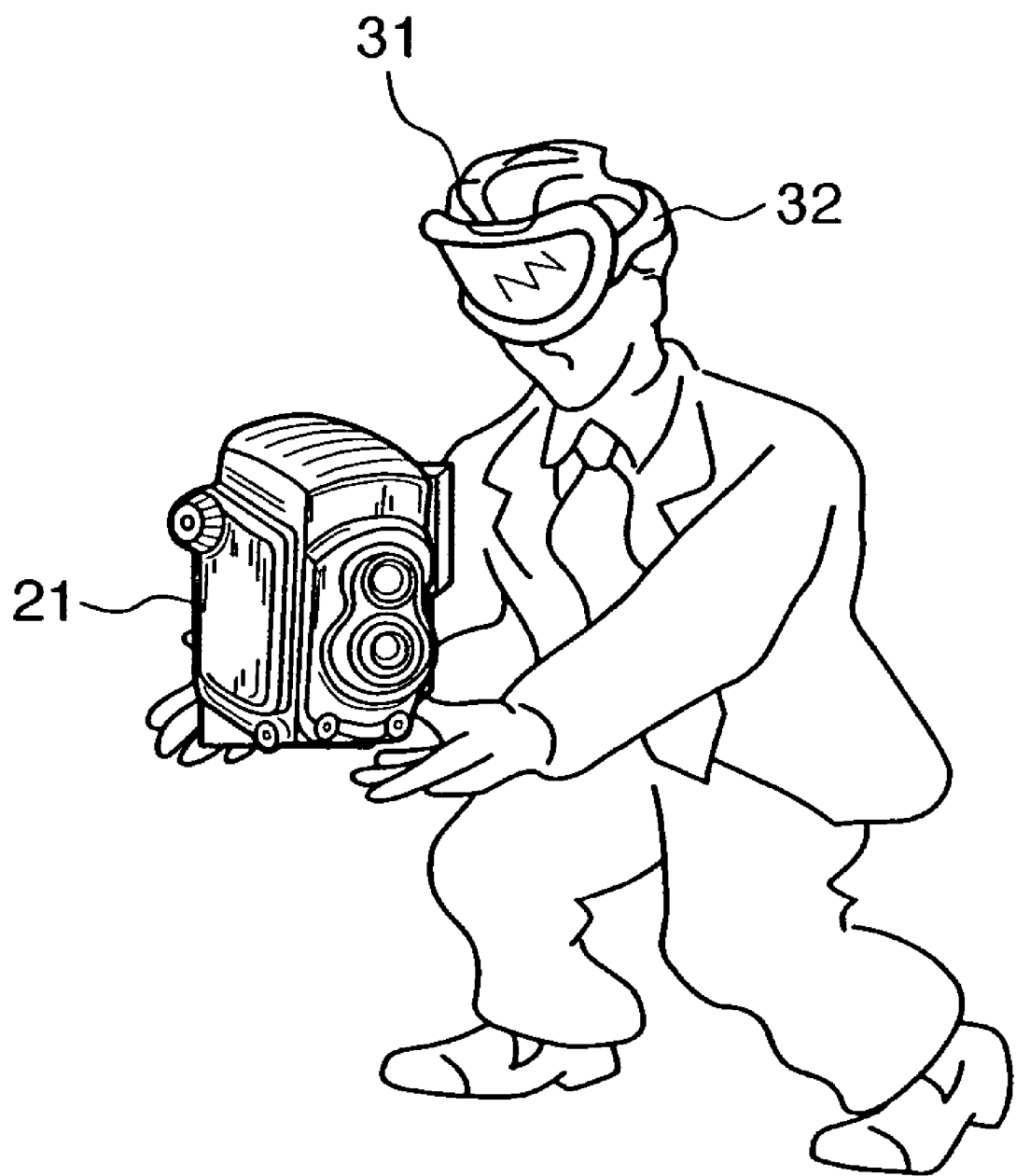
FIG. 14 depicts a state to be observed by the user via an HMD when a 3D CG is normally superimposed in the mock-up system in the third embodiment of the present invention.

FIG. 13 shows a state wherein a user 31 experiences the digital mock-up system from the perspective of a third party (whose does not wear any HMD). The user 31 wears an HMD 32 (head-mounted display) which displays a mixed reality space image on the head, and picks up the mock-up 11. As a result, the user 31 does not see any real shape of the mock-up 11 but can see the 3D CG camera 21 superimposed on it instead (FIG. 14).

The 3D CG camera 21 is superimposed on the mock-up 11 by matching the position and orientation data transmitted from the position and orientation sensor 12 with those upon rendering the CG camera 21 before the user experiences the mock-up system, and displaying the CG camera 21 to follow the position and orientation transmitted from the position and orientation sensor 12.

Figure 15:
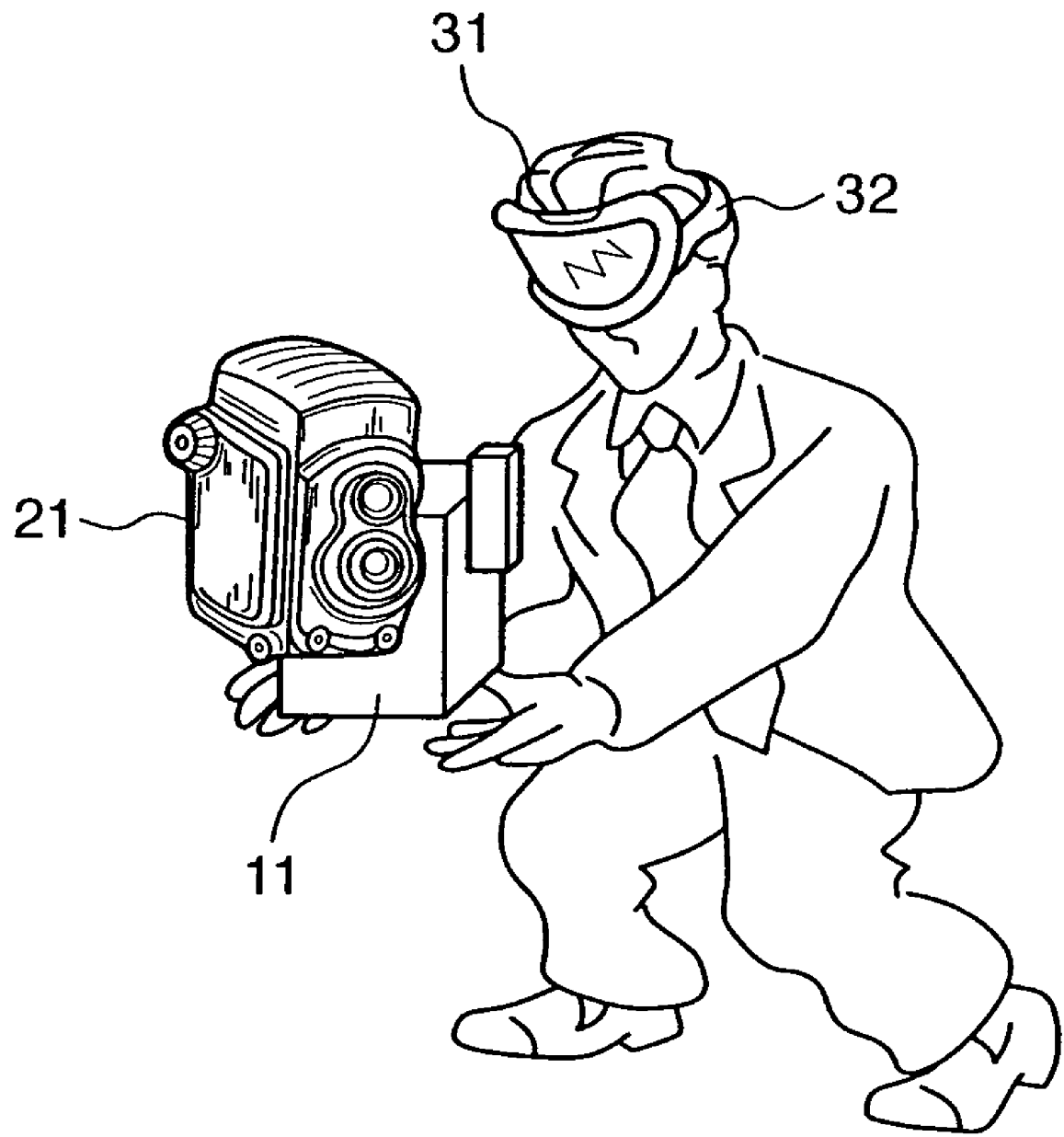
FIG. 15 depicts a state to be observed by the user via the HMD when a 3D CG is misaligned and superimposed in the mock-up system in the third embodiment of the present invention.

However, as described above, the position and orientation information transmitted from the position and orientation sensor 12 often suffers errors from an actual position and orientation due to an elapse of time and movement of the mock-up 11. Since the CG camera 21 is rendered on the basis of the position and orientation information transmitted from the position and orientation sensor 12, if the position and orientation sensor 12 causes errors, it outputs a position different from the actual position and orientation of the mock-up 11. As a result, the camera 21 formed of a 3D CG image is superimposed at a position deviating from the mock-up 11. As shown in FIG. 15, the user 31 observes the CG camera 21 which should be superimposed on the mock-up 11 but is displayed at a deviating position, and can no longer experience the mock-up 11 with his or her hand as the CG camera 21.

Such errors change depending on an environment and the type of position and orientation sensor 12. For example, in case of a gyro sensor, an accumulated error often occurs. Also, other position and orientation sensors do not provide any assurance that they can correctly transmit initially set position and orientation information.

Figure 16:
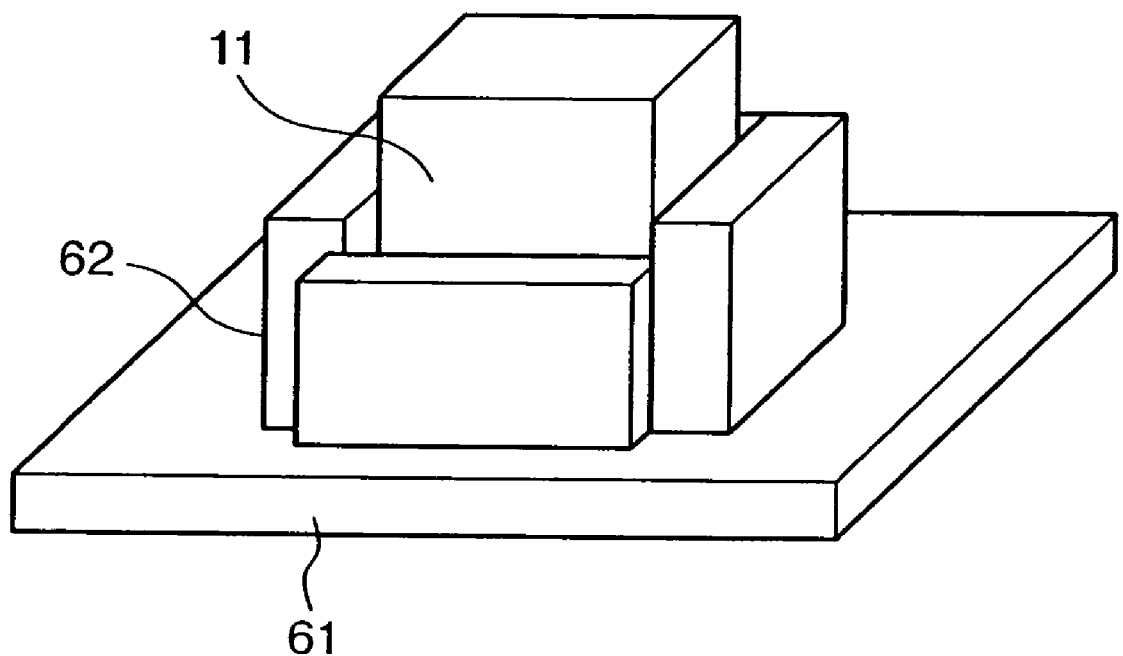
FIG. 16 is a block diagram showing an example of the arrangement of a calibration device according to the third embodiment of the present invention.

To solve this problem, this embodiment uses a calibration device 61 which holds the mock-up 11 with the position and orientation sensor 12 at a known position, as shown in FIG. 16. The calibration device 61 has a guide 62, which serves to guide and hold the mock-up 11 at a known position and orientation. The calibration device 61 can be placed at an arbitrary location as long the position and orientation to be output from the position and orientation sensor of the mock-up 11 are known while the mock-up 11 is normally set along the guide 62. For example, the calibration device 61 can be placed on the support base 101 in the first and second embodiments.

When the user 31 places the mock-up 11 on the calibration device 61 along the guide 62, the position and orientation of the mock-up 11 match predetermined ones, and the position and orientation of the position and orientation sensor 12 are also determined. The position and orientation sensor is calibrated by setting correct position and orientation data as the output from the position and orientation sensor 12 while the mock-up 11 is placed on the calibration device 61.

In order to naturally execute a calibration process executed during execution of an application, for example, a digital mock-up application of this embodiment sets the calibration device 61 as the storage location of the mock-up 11. The user 31 picks up the mock-up 11 from the calibration device 11 when he or she starts an experience and returns it to the calibration device 61 when he or she ends the experience.

For example, a switch or the like may be provided to the bottom surface of the calibration device to detect if the mock-up 11 is placed on the calibration device 61. When the calibration process is executed upon detection of such state, correct position and orientation data can always be set while the mock-up 11 is placed on the calibration device 61. As a result, since the user 31 can use the mock-up 11 with the position and orientation sensor 12 which is always set with the latest, correct position and orientation data, the positional deviation between the CG camera 21 and mock-up 11 can be minimized, and the user 31 can experience as if he or she were holding a real camera.

In this embodiment, a description of the arrangement and operation associated with generation of a mixed reality space image, except for the calibration process of the position and orientation sensor, is omitted. For example, the arrangement shown in FIG. 1 can be used while replacing the real object 102 by the mock-up 11, the third position and orientation sensor 105 by the position and orientation sensor 12, and the head-mounted display 106 by the HMD 32.

In other words, in the application described in the first and second embodiments, this embodiment can be applied as the calibration method of the third position and orientation sensor 105 provided to the real object 102. For example, when this embodiment is applied to the first embodiment, the calibration device 61 can be set as the storage location of the real object 102. When this embodiment is applied to the second embodiment, the calibration device 61 can be set as the initial position of the real object 102.

Another Embodiment

In the first embodiment described above, the texture or scale of a 3D CG image is changed in correspondence with the location where the real object 102 is placed. That is, in the first embodiment, the 3D CG model (teapot) itself remains unchanged, and its rendering attribute is changed. However, the 3D CG model itself may be changed in correspondence with the position and orientation of the real object 102.

The present invention includes a case wherein the equivalent functions are achieved by supplying a software program that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-343572 filed Oct. 1, 2003, which is hereby incorporated by reference herein.

What is claimed is:

1. An image processing method for representing to a user, by means of a display device, a combined image of an image of a real object and a CG image, said method comprising:
   a position detection step of detecting a position of a real object on a support base in a real world;
   a management step of associating a plurality of levels of transparency for the CG image with respective locations on the support base in the real world;
   a combining step of generating a combined image by superimposing the CG image on the image of the real object, wherein the CG image has a level of transparency which is the level of transparency that was associated with the location of the real object in the management step; and
   an output step of outputting the combined image for display on the display device.

2. The method according to claim 1, wherein the real object is held by the user when the position of the real object is changed.

3. The method according to claim 1, wherein the levels of transparency that can be associated with respective locations on the support base include at least opaqueness and translucency.

4. An image processing apparatus comprising:
   a position detection means for detecting a position of a real object on a support base in a real world;
   management means for associating a plurality of levels of transparency for a CG image with respective locations on the support base in the real world;
   combining means for generating a combined image by superimposing the CG image on the image of the real object, wherein the CG image has a level of transparency which is the level of transparency which was associated with the location of the real object by the management means; and
   output means for outputting the combined image for display on a display device.

5. A computer-readable recording medium storing, in executable form, a computer program for causing a computer to execute an image processing method for representing to a user, by means of a display device, a combined image of an image of a real object and a CG image, the method comprising:
   a position detection step of detecting a position of a object on a support base in a real world;
   a management step of associating a plurality levels of transparency for the CG image with respective locations on the support base in the real world;
   a combining step of generating a combined image by superimposing the CG image on the image of the real object, wherein the CG image has a level of transparency which is the level of transparency that was associated with the location of the real object in the management step; and
   an output step of outputting the combined image for display on the display device.

* * * * *